May 26, 1925.  1,539,676
E. W. LABOMBARDE
ICE CREAM BOX AND METHOD OF MAKING THE SAME
Filed Jan. 16, 1924
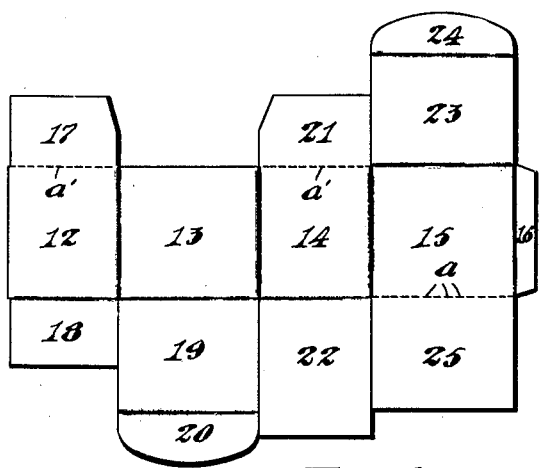
Fig.1.
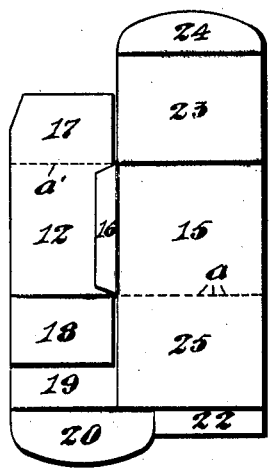
Fig.2.
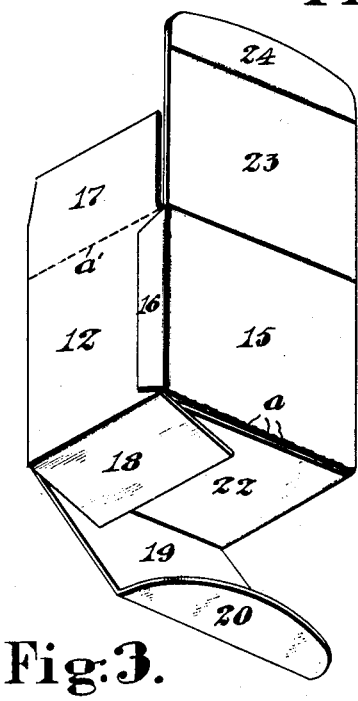
Fig.3.
Fig.4.
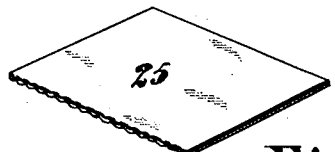
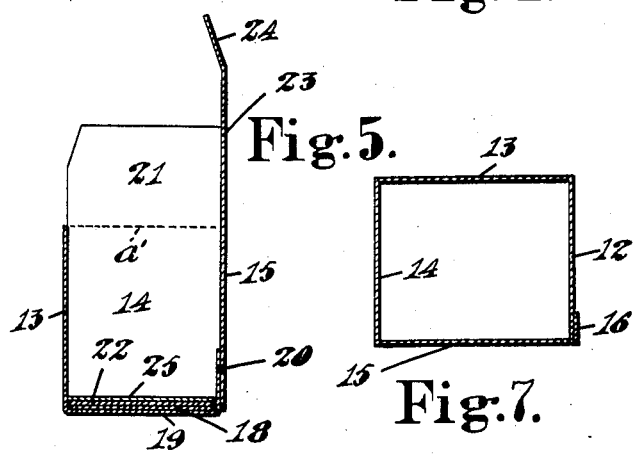
Fig.5.
Fig.7.
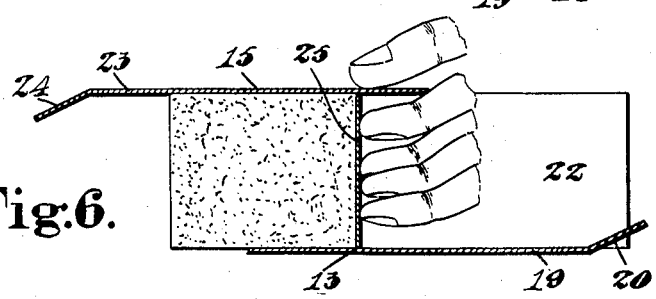
Fig.6.
INVENTOR
ELIE W. LABOMBARDE
BY
ATTORNEY Patented May 26, 1925.

1,539,676

UNITED STATES PATENT OFFICE.

ELIE W. LABOMBARDE, OF NASHUA, NEW HAMPSHIRE.

ICE-CREAM BOX AND METHOD OF MAKING THE SAME.

Application filed January 16, 1924. Serial No. 686,511.

*To all whom it may concern:*

Be it known that I, ELIE W. LABOMBARDE, a citizen of the United States, and resident of Nashua, in the county of Hillsborough and State of New Hampshire, have invented certain new and useful Improvements in Ice-Cream Boxes and Methods of Making the Same, of which the following is a specification.

This invention relates to the manufacture of paper boxes and has particular reference to the production of containers for soft, or semi-liquid, or frozen goods such as ice cream.

Paper or pasteboard boxes or pails most commonly used at present, especially those which are filled in stores and carried home by individual customers, are of tapering shape so they may be nested for the purpose of saving space when they are shipped or stored. Boxes of such shape can not be made otherwise than partly or wholly by hand, or by very expensive machines which are slow in production because of the necessity of folding different portions of the boxes in different relative directions. And it is essential that boxes which are to be used for carrying ice cream from a store to one's home shall have bottoms and side walls as leak-proof as possible. To attain the best results in this respect, it has been necessary heretofore to make the boxes in open or set up condition with their bottom flaps adhesively secured. Therefore they could not be made in flat folded condition and so shipped or stored. And this is true whether they are of tapering form or are of uniform diameter from end to end.

One of the objects of my present invention is to provide boxes suitable for containing ice cream or other substances, which boxes can be made in flat-folded condition by high-speed automatic machines, shipped or stored in such flat-folded condition, and can be converted to open or set up condition as wanted, and yet be practically leak-proof.

Another object of my invention is to provide boxes from which the contents can be readily removed in solid or block form. Heretofore, when ice cream was carried home in a paper box or pail, it was the common practice to dip it out with a spoon. This takes time and renders it impossible to deposit the ice cream on a plate in any definite form. My present invention enables me to provide paper boxes each of which includes a member which can be used as a pusher to eject the ice cream as a block or solid mass which can then be cut into slices which are preferable to ice cream dipped or dug out with a spoon.

In carrying out my invention I provide blanks each of which, when died out, carries a section that is readily detachable therefrom but which remains attached during the folding of the blank to flat-folded condition and also until the flat-folded box is to be opened or set up for use at which time said section is detached and fitted inside the box to strengthen the bottom of the box and coact with foldable flaps to make the box practically leak-proof, said section being later usable as an ejector for the contents of the box.

Blanks such as described are foldable on two parallel lines and, therefore, can be converted to flat folded boxes and completed by machines of the continuous or rotary type such as illustrated in Letters Patent No. 1,096,633, granted to me May 12, 1914, such machines being capable of operating at a productive speed of more than 50,000 an hour.

Of the accompanying drawings:—

Figure 1 is a plan view of one form of blank for making one of my improved boxes.

Figure 2 is a plan view of a similar blank in its flat-folded condition ready to be set up to container form.

Figure 3 is a perspective view of the same when partly set up.

Figure 4 is a perspective view of the section piece which has been detached from the folded blank, ready to be inserted in the bottom of the set up box.

Figure 5 represents a vertical section of the completely set up box.

Figure 6 represents a longitudinal section of the box from which the contents are being ejected.

Figure 7 represents a transverse section of the box in squared or open set up condition.

Similar reference characters designate similar parts in all of the views.

Referring first to Figure 1, the blank, which will be of such size and be so proportioned as to best suit the quantity and kind of material to be carried in the completed box, is cut and creased to provide wall sections 12, 13, 14, 15, the latter having an edge flap 16. The section 12 has flaps 17, 18, the section 13 has a flap 19 at the end of which is a tucking flap 20, the section 14 has flaps 21, 22, and the section 15 has a flap 23 provided with a tucking flap 24. Opposite the flap 23 is a section 25 which is detachable from the section 15 as by means of a line of perforations $a$.

For a reason explained hereinafter, it is sometimes desirable that the flaps 17, 21, may be readily detached. For this purpose lines of perforations $a'$ coincide with the crease lines on which said flaps are folded.

The blanks are, preferably and while flat, first printed in any suitable manner and then paraffined or waxed to provide a high-gloss finish in a manner such as explained in my application filed March 2, 1922, Serial No. 540,604.

When the blanks are folded to the condition illustrated by Figure 2, the edge flap 16 which is at one end of the row of four wall sections is adhesively secured to the outer surface of the margin of section 12 which is at the other end of said row and therefore, when the box is set up the edge flap 16 is on the outside of the box (Fig. 7) instead of on the inside as has been the customary practice heretofore. The reason for this will be presently explained. If the blanks are waxed before folding, the adhesion just referred to will be rendered more durable either by omitting wax from the surfaces which are to be glued together, or by driving it in, or by removing it from said surfaces.

The boxes in the flat-folded condition shown by Figure 2 can be packed closely for shipment or storage, or piled on a shelf in a store, each box being certain to have with it the section 25 which, later, possesses the double function presently described.

In most if not all stores there are quiet periods when a clerk, or clerks, can use the time to set up a number of the flat boxes to open or goods-receiving condition, to be ready for customers. When a flat box is to be so converted, the section 25 is first detached and the four wall sections squared up to the condition indicated by Figure 7. Then the flaps 18, 22, are turned or folded in and overlapped (Fig. 3) and the bottom flap 19 is folded up and its flap 20 tucked past the edges of the flaps 18, 22, and up inside the lower portion of the wall 15 (Fig. 5). Then the square section or plate 25 which had been temporarily laid aside (Fig. 4) is fitted down inside the set up box (Fig. 5) its proportions being such that its edges abut with considerable pressure against the inner surfaces of the walls 12, 13, 14, and the up-turned tucking flap 20, locking the latter and confining the flaps 18, 22, closely between it and the bottom flap 19. Said paper plate 25, coacting as just described with the folded bottom members, makes the bottom of the receptacle practically leak-proof so that ice cream, even if partly melted, can not exude. The attainment of this result is materially aided by the wax carried by the plate member 25. When the blank, including the member 25 is waxed in the manner described in my application Serial No. 540,604 above referred to, it is quite heavily coated with hot wax and then so quickly chilled by cold water that most of the wax remains on the surface of the paper instead of sinking in. The result is that all the edges of the section or plate member 25 and the perforated line $a$ carry surface wax. Then, when said section 25 is detached and pushed into and against the bottom of the set up box, the leak-proof quality of the box is materially increased by the wax carried by the edges of the said section 25.

After the box, while set up and open as indicated by Figure 5, has been filled, the top flaps 17, 21, are folded toward each other and the cover flap 23 is closed down and its flap 24 tucked in, such closing being in a manner so well known as to require no illustration.

When the box is to be emptied, the top flaps are opened and the box laid on one side on a suitable serving dish or plate. Then the bottom 19 is opened and the flaps 18, 22, swung aside. A person can then, by simply pushing the fingers against the plate section 25, cause the latter to act as an ejector pushing the ice cream out as a block (Fig. 6) onto any suitable serving dish or plate.

The ejection of the ice cream as a block with smooth sides is facilitated if the flaps 17, 21, are first removed. The removal of such flaps so as to avoid excessively rough or torn edges which would mar the sides of an outwardly moving block of ice cream, is facilitated by the provision of the lines of perforations $a'$ (Figs. 1, 2 and 3) which are combined with the crease lines for those flaps. Such smooth ejection of the block is also facilitated by the fact that the glued flap 16 is on the outer surface of the wall section 12 (Fig. 7) instead of on the inner surface as has been the usual practice in making paper cartons. Furthermore, this last mentioned feature results in there being less liability of the ice cream being in contact with any glue than when or if the flap 16 extended inside the wall section which it overlaps.

I have so far referred to my improved box as being especially useful in stores where each box is filled for an individual customer. But the boxes made of waxed blanks are also useful for the purpose of being filled by the ice cream manufacturers and stored or packed in larger refrigerating containers and removed from the latter as wanted.

This is more economical than the quite commonly practiced method of wrapping "bricks" of ice cream in sheets of waxed paper and then placing the wrapped bricks in boxes.

Having now described my invention, I claim:

1. A foldable box blank cut and creased to provide four wall sections with foldable bottom and top flaps, said blank having an integral but separable section having an area and adapted and intended to closely fit the inside of the box when said blank is folded and set up to box form and to be freely pushed through the box.

2. A paper box having interfolded bottom members including a flap tucked inside against one of the walls of the box, and a separate combined plunger and locking member fitting the inside of the box close to said bottom members and bearing against the tucked flap.

3. The method of making a paper box consisting in first dieing out a blank to provide wall sections, top and bottom flaps and a detachable section, then folding the blank to flat condition, then detaching the last mentioned section, then setting up the blank to the form of a container, and then inserting the detached section against the bottom flaps of the container.

4. The method of making a paper box consisting in first dieing out a blank to provide wall sections, top and bottom flaps and a detachable section, then waxing the blank including the detachable section while in flat form, then folding the blank to flat condition, then removing said detachable section, then setting up the blank to the form of a container, and then inserting the detached section against the bottom flaps of the container.

In testimony whereof I have affixed my signature.

ELIE W. LABOMBARDE.